(12) United States Patent
Lection et al.

(10) Patent No.: US 9,836,652 B2
(45) Date of Patent: Dec. 5, 2017

(54) SHOWING DANGER AREAS ASSOCIATED WITH OBJECTS USING AUGMENTED-REALITY DISPLAY TECHNIQUES

(71) Applicant: International Business Machines Corporation, Armonk, NY (US)

(72) Inventors: David B. Lection, Raleigh, NC (US); Sarbajit K. Rakshit, Kolkata (IN); Mark B. Stevens, Austin, TX (US); John D. Wilson, League City, TX (US)

(73) Assignee: International Business Machines Corporation, Armonk, NY (US)

( * ) Notice: Subject to any disclaimer, the term of this patent is extended or adjusted under 35 U.S.C. 154(b) by 1 day.

(21) Appl. No.: 15/013,278

(22) Filed: Feb. 2, 2016

(65) Prior Publication Data
US 2017/0220863 A1    Aug. 3, 2017

(51) Int. Cl.
*G06K 9/00* (2006.01)
*G06T 19/00* (2011.01)
(Continued)

(52) U.S. Cl.
CPC ..... *G06K 9/00671* (2013.01); *G02B 27/0172* (2013.01); *G06F 3/005* (2013.01);
(Continued)

(58) Field of Classification Search
CPC ............ G06K 9/00671; G06K 9/00805; G06F 3/005; G06F 3/011; G06T 11/001;
(Continued)

(56) References Cited

U.S. PATENT DOCUMENTS 8,953,841 B1    2/2015    Leblang et al.
2010/0240988 A1    9/2010    Varga et al.
(Continued)

FOREIGN PATENT DOCUMENTS

KR        101431424 B1    8/2014
WO    WO 2012/101720 A1    8/2012
(Continued)

OTHER PUBLICATIONS

Atiyeh, Clifford, "Saving Your Glass: Harman Demos Active Safety Warnings on Google Glass [2014 CES]", Hearst Communications, Car and Driver Blog, http://blog.caranddriver.com/saving-your-glass-harman-demos-active-safety-warnings-on-google-glass-2014-ces/, Jan. 8, 2014, 5 pages.
(Continued)

*Primary Examiner* — Jwalant Amin
(74) *Attorney, Agent, or Firm* — Stephen R. Tkacs; Stephen J. Walder, Jr.; Kurt P. Goudy

(57) ABSTRACT

A mechanism is provided for indicating an area of an object that is considered dangerous to a user via a head mounted display (HMD) system. The object being used by the user and one or more areas of the object that are considered dangerous are identified. Responsive to identifying one or more areas of the object that are considered dangerous, an overlay for each of the one or more areas of the object that are considered dangerous is generated. The overlay for each one or more areas of the object that are considered dangerous is displayed via a display layer of the HMD system so that the one or more areas of the object that are considered dangerous are identified as an overlay to the object that is being seen by the user through the HMD system.

17 Claims, 8 Drawing Sheets

(51) Int. Cl.
*G06F 3/00* (2006.01)
*G06T 11/00* (2006.01)
*G02B 27/01* (2006.01)
*G06F 3/01* (2006.01)

(52) U.S. Cl.
CPC ........ *G06K 9/00805* (2013.01); *G06T 11/001* (2013.01); *G06T 19/006* (2013.01); *G02B 2027/0138* (2013.01); *G02B 2027/0141* (2013.01); *G06F 3/011* (2013.01)

(58) Field of Classification Search
CPC .............. G06T 19/006; G02B 27/0172; G02B 2027/0138; G02B 2027/0141
See application file for complete search history.

(56) References Cited

U.S. PATENT DOCUMENTS

| | | | |
|---|---|---|---|
| 2010/0300256 A1 | 12/2010 | Loewe et al. | |
| 2012/0194554 A1* | 8/2012 | Kaino | G08B 13/19621 345/633 |
| 2012/0306615 A1* | 12/2012 | Lee | F16P 3/142 340/5.51 |
| 2013/0044128 A1* | 2/2013 | Liu | G09G 5/00 345/633 |
| 2013/0258488 A1* | 10/2013 | Hatakeyama | B60K 35/00 359/630 |
| 2013/0278631 A1 | 10/2013 | Border et al. | |
| 2013/0307986 A1* | 11/2013 | Numata | B60R 1/00 348/148 |
| 2014/0046632 A1 | 2/2014 | Solihin | |
| 2014/0168266 A1* | 6/2014 | Kimura | G02B 27/0172 345/633 |
| 2014/0184643 A1 | 7/2014 | Friend | |
| 2015/0070388 A1 | 3/2015 | Sheaffer et al. | |
| 2016/0314623 A1* | 10/2016 | Coleman | G02B 27/017 |

FOREIGN PATENT DOCUMENTS

| | | |
|---|---|---|
| WO | WO 2013/169601 A2 | 11/2013 |
| WO | WO 2014/100688 A2 | 6/2014 |

OTHER PUBLICATIONS

Dzwiarek, Marek et al., "Application prospects of the augmented reality technology for improving safety of machine operators", INTECH Open Access Publisher, Human Computer Interaction: New Developments, Chapter 11, Oct. 1, 2008, 15 pages.

Hall, Zac, "DriveSafe turns Google Glass into a safety warning system for drivers", Google, 9to5Google, http://9to5google.com/2014/01/14/drivesafe-turns-google-glass-into-a-safety-warning-system-for-drivers/, Jan. 14, 2014, 3 pages.

Wang, Xiangyu, "Improving Human-Machine Interfaces for Construction Equipment Operations with Mixed and Augmented Reality", INTECH Open Access Publisher, Robotics and Automation in Construction, Chapter 14, Oct. 1, 2008, 16 pages.

* cited by examiner

SHOWING DANGER AREAS ASSOCIATED WITH OBJECTS USING AUGMENTED-REALITY DISPLAY TECHNIQUES

BACKGROUND

The present application relates generally to an improved data processing apparatus and method and more specifically to mechanisms for showing danger areas associated with objects to a user using augmented-reality display techniques.

A large and growing population of users is enjoying entertainment through the consumption of digital media items, such as music, movies, images, electronic books, and so on. The users employ various electronic devices to consume such media items. Among these electronic devices (referred to herein as user devices) are electronic book readers, cellular telephones, personal digital assistants (PDAs), portable media players, tablet computers, netbooks, laptops and the like. A basic issue with mobile devices, such as cell phones, PDAs, tables, and mobile game consoles has always been screen size. On one hand, a large screen is beneficial for watching movies, playing games, and even reading e-mail comfortably. On the other hand, the larger the screen, the bigger the device, which may be less desirable for a light and portable product. Another problem consumers experience with portable devices, like tablet devices, is the lack of ability to immerse themselves in a tablet experience, such as watching a movie on an airplane.

One technology directed to address the size dilemma is head mounted display (HMD) systems. Conventional consumer HMD systems, such as TV glasses and virtual-reality goggles, are usually heavy, expensive and uncomfortable to use for long periods of time. More recently, lighter and more affordable products have been developed in video glasses. HMD systems have display optics, such as lenses, which are placed in front of one or both eyes of a user. The HMD may have one display or two miniaturized displays, such as liquid crystal display (LCD), Liquid Crystal on silicon (LCos), or organic light-emitting diode (OLED).

There are some HMD systems with opaque lenses and some HMD systems with transparent lenses (also referred to as optical HMD systems or smart glasses). The opaque systems do not readily allow a user to reengage with the outside world without physically moving or removing the HMD system. On the other hand, the transparent systems do not allow a user to immerse in the experience.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for indicating an area of an object that is considered dangerous to a user via a head mounted display (HMD) system. The illustrative embodiment identifies the object being used by the user. The illustrative embodiment identifies one or more areas of the object that are considered dangerous. The illustrative embodiment generates an overlay for each of the one or more areas of the object that are considered dangerous in response to identifying one or more areas of the object that are considered dangerous. The illustrative embodiment displays the overlay for each one or more areas of the object that are considered dangerous via a display layer of the HMD system so that the one or more areas of the object that are considered dangerous are identified as an overlay to the object that is being seen by the user through the HMD system.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
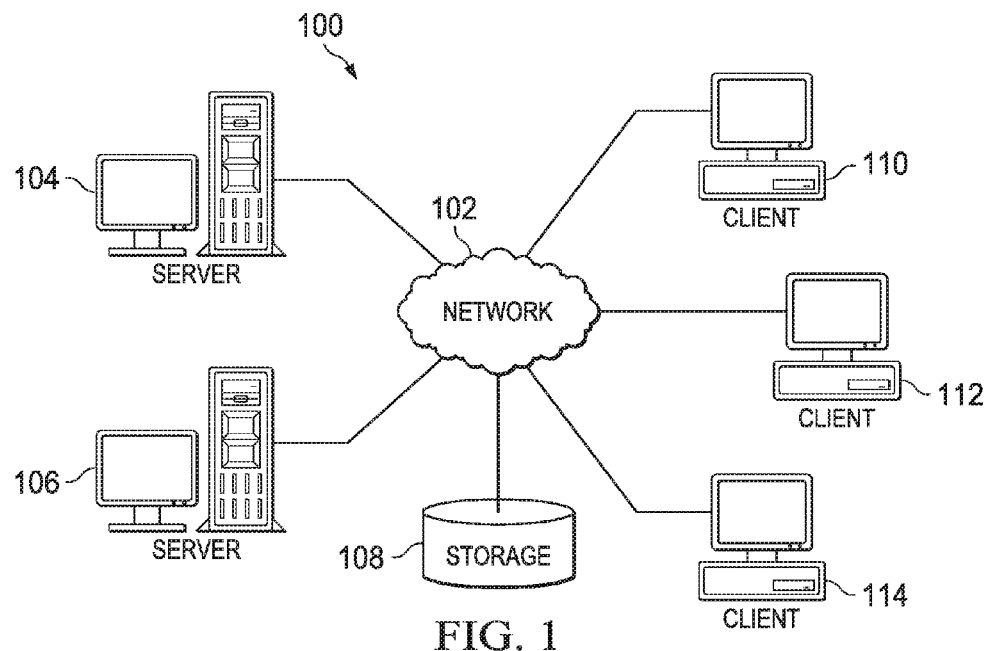
FIG. 1 is an example diagram of a distributed data processing system in which aspects of the illustrative embodiments may be implemented.

In some instances, users overlook danger areas associated with objects, such as machine tools, hand tools, chemicals, or the like, due to ignorance, complacency, or the like, which may cause loss of life, limb, organ, or the like. For example, with a table saw, if a user's hands are moving towards or near the moving blade, such use of the table saw may be putting their fingers, hand, or the like, in danger. While some danger areas associated with objects are evident, other danger areas are not so evident. The evident danger areas may be any object that is viewable, not so evident danger areas may be where a bit, blade, or brake will actually move into an area where perhaps the user's hand is located or where the user's hand is predicted to move. While many objects have built in safeguards, people still are injured at home or in an industrial setting on a daily basis.

In order to reduce the number of injuries experienced by users of objects, the illustrative embodiments provide an augmented-reality (AR) control mechanism for showing danger areas near objects to a user. Utilizing head mounted display (HMD) mechanisms, such as glasses, goggles, face shield, or the like; the illustrative embodiments utilize object recognition to detect the object being utilized by the user. Once the object is identified, the HMD mechanism references a catalog of danger areas associated with objects to identify danger areas associated with the detected object. When utilizing an augmented-reality (AR) control mechanism, the HMD mechanism in conjunction with the AR control mechanism overlays the danger areas associated with the detected object. Thus, the user of the HMD system not only sees the object that is being used, but also visualizes the danger areas associated with the object as is presented by the AR control mechanism. In addition, if the HMD mechanism detects an event such as the user's hand getting too close to the blade of a table saw, then the HMD mechanism in conjunction with the AR control mechanism may cause a flashing light to be displayed to the user, the HMD mechanism to vibrate, or some other notification through the HMD mechanism. Further, based on the identified danger areas associated with the object, the HMD mechanism in conjunction with the AR control mechanism may distinguish different danger zones with varying degrees of danger utilizing different colors or shades of color.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general-purpose hardware, software instructions stored on a medium such that the instructions are readily executable by specialized or general-purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
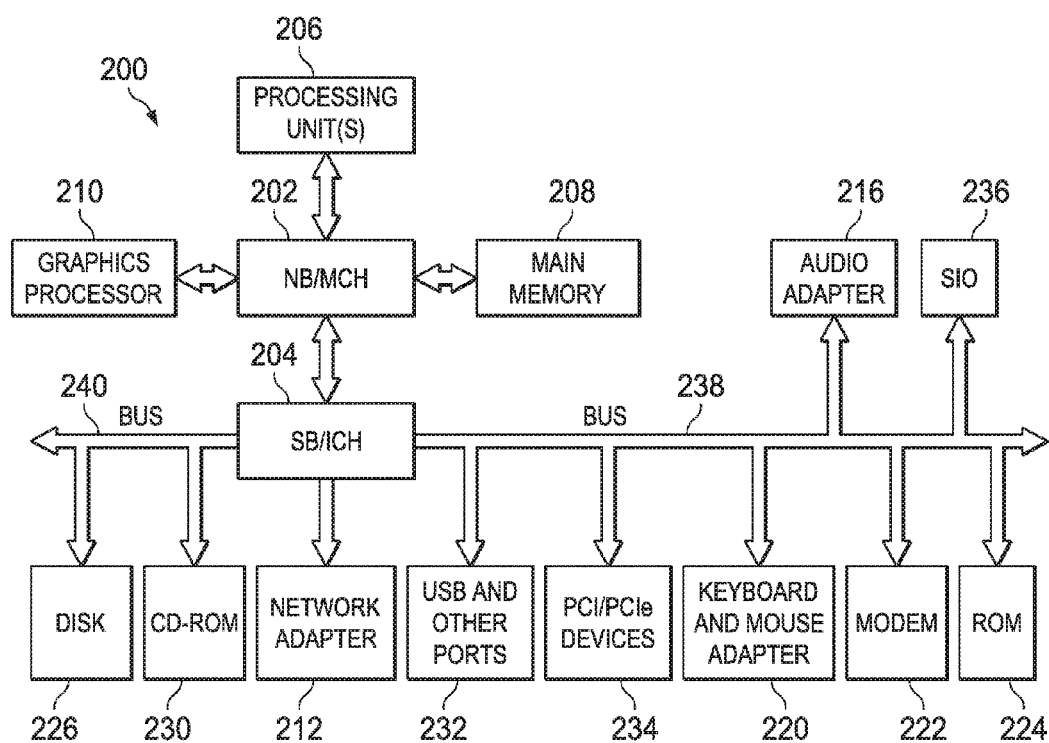
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement an augmented-reality (AR) control system for showing danger areas near objects to a user. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general-purpose computing device. Moreover, as described hereafter, the implementation of the mechanisms of the illustrative embodiments improves the functionality of the computing device and provides a useful and concrete result that facilitates showing danger areas near objects to a user using augmented reality display techniques.

As noted above, the mechanisms of the illustrative embodiments utilize specifically configured computing devices, or data processing systems, to perform the operations for showing danger areas near objects to a user using augmented reality display techniques. These computing devices, or data processing systems, may comprise various hardware elements that are specifically configured, through either hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect, to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System P® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to an augmented-reality (AR) control mechanism for showing danger areas near objects to a user.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. In addition, the processes of the illustrative embodiments may be applied to a multiprocessor data processing system without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
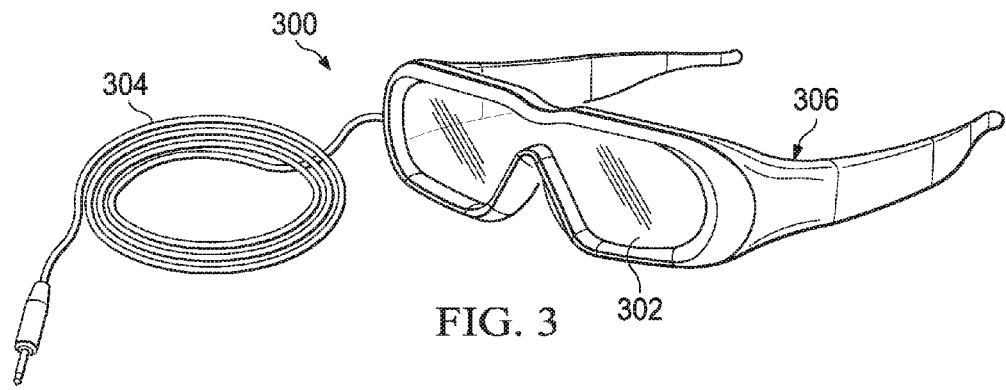
FIG. 3 is a perspective view of a wired HMD system with augmented-reality (AR) control in accordance with an illustrative embodiment.

FIG. 3 is a perspective view of wired HMD system 300 with augmented-reality (AR) control in accordance with an illustrative embodiment. Wired HMD system 300 includes lens 302, wire 304, and assembly 306. Assembly 306 may be frames for glasses that hold or support the lens 302. While assembly 306 is shown for glasses, the illustrative embodiments recognize that, in a different embodiment, assembly 306 may be for goggles, a face shield, or the like. That is, other assemblies may be used for wired HMD system 300. Wire 304 couples wired HMD system 300 to an electronic device (not illustrated in FIG. 3). For example, wire 304 may include a standard or proprietary plug that plugs into a socket of the electronic device. The electronic device may include circuitry or software to detect when wired HMD system 300 is connected for one or more various modes of operation of the electronic device. Wired HMD system 300 may include electronics to display the images on a first display layer and to control transparency of a second layer as described herein. Assembly 306 may house the display electronics as well as the communication circuitry for wired communication over wire 304. Lens 302 of FIG. 3 includes two layers as described in detail below. One layer is a display layer for displaying AR images and another layer is a transparent layer for safety of the user. That is, the first layer is controllable by an AR control mechanism for showing danger areas associated with objects, such as machine tools, hand tools, chemicals, or the like, to a user as described herein.

Figure 4:
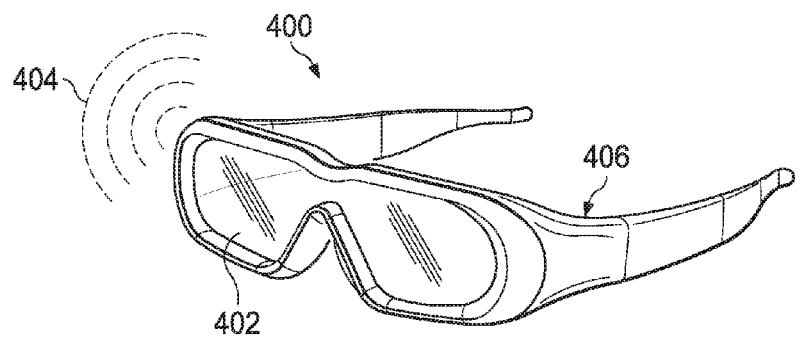
FIG. 4 is a perspective view of a wireless HMD system with augmented-reality (AR) control in accordance with an illustrative embodiment.

FIG. 4 is a perspective view of wireless HMD system 400 with augmented-reality (AR) control in accordance with an illustrative embodiment. Wireless HMD system 400 includes lens 402, wireless circuitry 404 (not illustrated) to wirelessly communicate with an electronic device (not illustrated in FIG. 4), and assembly 406. Wireless circuitry 404 in wireless HMD system 400 may use various wireless technologies to communicate with the electronic device. The electronic device may also include circuitry or software to detect when wireless HMD system 400 is within range and activated for one or more various modes of operation of the electronic device. Wireless HMD system 400 may include electronics to display the images on a first display layer while a second display layer provides safety to the user. That is, the first layer is controllable by an AR control mechanism for showing danger areas associated with objects to a user as described herein.

Lens 302 of FIG. 3 and lens 402 of FIG. 4 are illustrated as a single lens, but in other embodiments, HMD systems, such as wired HMD system 300 of FIG. 3 or wireless HMD system 400 of FIG. 4 may include multiple lenses, such as one lens for each eye. The shape and size of the glasses, goggles, or face shield that hold the one or more lenses may also vary. The following description uses a single lens for purposes of description except as specifically noted.

Figure 5:
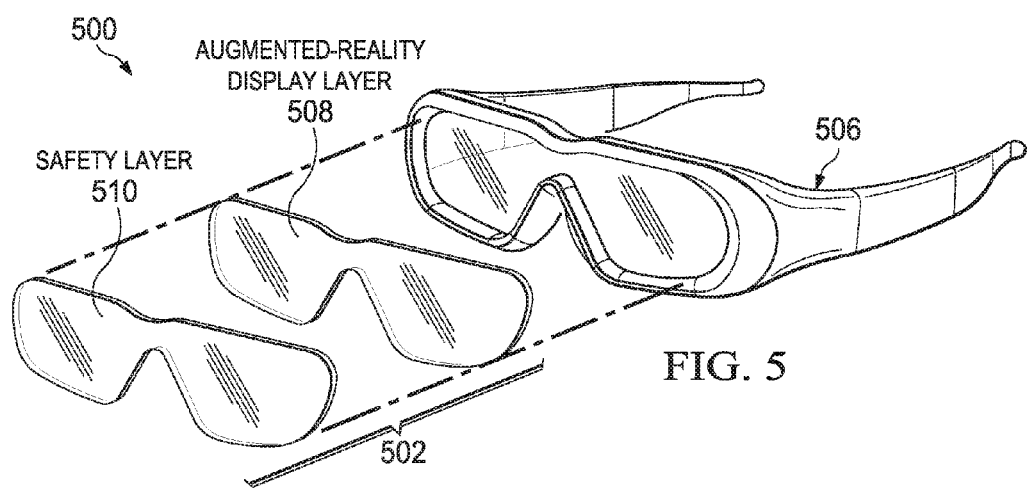
FIG. 5 is a perspective view of a HMD system with an augmented-reality (AR) display layer and safety layer in lens that fit within an assembly of the HMD system in accordance with an illustrative embodiment.

FIG. 5 is a perspective view of a HMD system 500 with augmented-reality (AR) display layer 508 and safety layer 510 in lens 502 that fits within assembly 506 in accordance with an illustrative embodiment. Lens 502 includes AR display layer 508 with one or more display units. The display units may be miniaturized. The one or more display units of AR display layer 508 may be liquid crystal display (LCD) units, liquid crystal on silicon (LCoS or LCOS) display units, or the like. AR display layer 508 may be a transparent material, semi-transparent material, or the like. AR display layer 508 displays images that may be two-dimensional (2D) images, three-dimensional (3D) images, or any combination thereof. For example, AR display layer 508 may be used with 3D technologies display danger areas associated with objects while the object is viewed through AR display layer 508 and safety layer 510 of lens 502. AR display layer 508 may display a computer-generated image (CGI) (also referred to as a virtual image), frames of a video, or a combination of both. For example, HMD system 500 may allow a CGI to be superimposed on a real-world view (augmented reality or mixed reality). Combining real-world view with CGI may be performed by projecting the CGI through a partially reflective mirror and viewing the real world directly (called Optical See-Through). Combining real-world view with CGI may also be done electronically by accepting video from a camera and mixing it electronically with CGI (called Video See-Through). The camera may be a peripheral of HMD system 500.

In one embodiment, AR display layer 508 may use an optical mixer with a capability of reflecting artificial images as well as letting real images to cross lens 502 and let the user to took through lens 502. Lens 502 may incorporate various optic technologies, such as curved minor or waveguide technologies, as well as diffraction optics, holographic optics, polarized optics, reflective optics, switchable waveguide, or the like. Regardless of the optic technologies and optic techniques, AR display layer 508 is used to display images from the electronic device.

Lens 502 may also include a safety layer 510. Safety layer 510 provides a safety not only to AR display layer 508 but also provides a layer of protection to the eyes of the user when the user is using power tools or industrial or laboratory equipment. Safety layer 510 may be glass that has been toughened or laminated so that safety layer 510 is less likely to splinter when broken or hit with another object.

HMD system 500 may include one or more peripherals associated with the lens 502 (or lenses). For example, HMD system 500 may include one or more cameras to identify a particular object that is being utilized by the user. HMD system 500 may incorporate a positioning system that tracks the wearer's head position and angle, so that the picture or symbol displayed is congruent with the outside world using see-through imagery. HMD system 500 may also be used with tracking sensors that allow changes of angle and orientation to be recorded. When such tracking data is available in the system computer, the tracking data may be used to generate the appropriate CGI for the angle-of-look at the particular time. HMD system 500 may also include eye tracking. Eye trackers measure the point of gaze, allowing a computer to sense where the user is looking. This information is useful in a variety of contexts such as user interface navigation by sensing the user's gaze, a computer may change the information displayed on a screen, bring additional details to attention, etc. HMD system 500 may also include one or more infrared cameras to detect body parts of the user as they enter the viewing area of lenses 502. HMD system 500 may also include hand tracking that tracks hand movement as well as predicts hand movement from the perspective of HMD system 500 to identify where the user's hands are and when the user's hands may be in danger with regard to the particular object that is being utilized. HMD system 500 may also include one or more input devices, such as touchpads, touch buttons, buttons, or other input devices.

Figure 6:
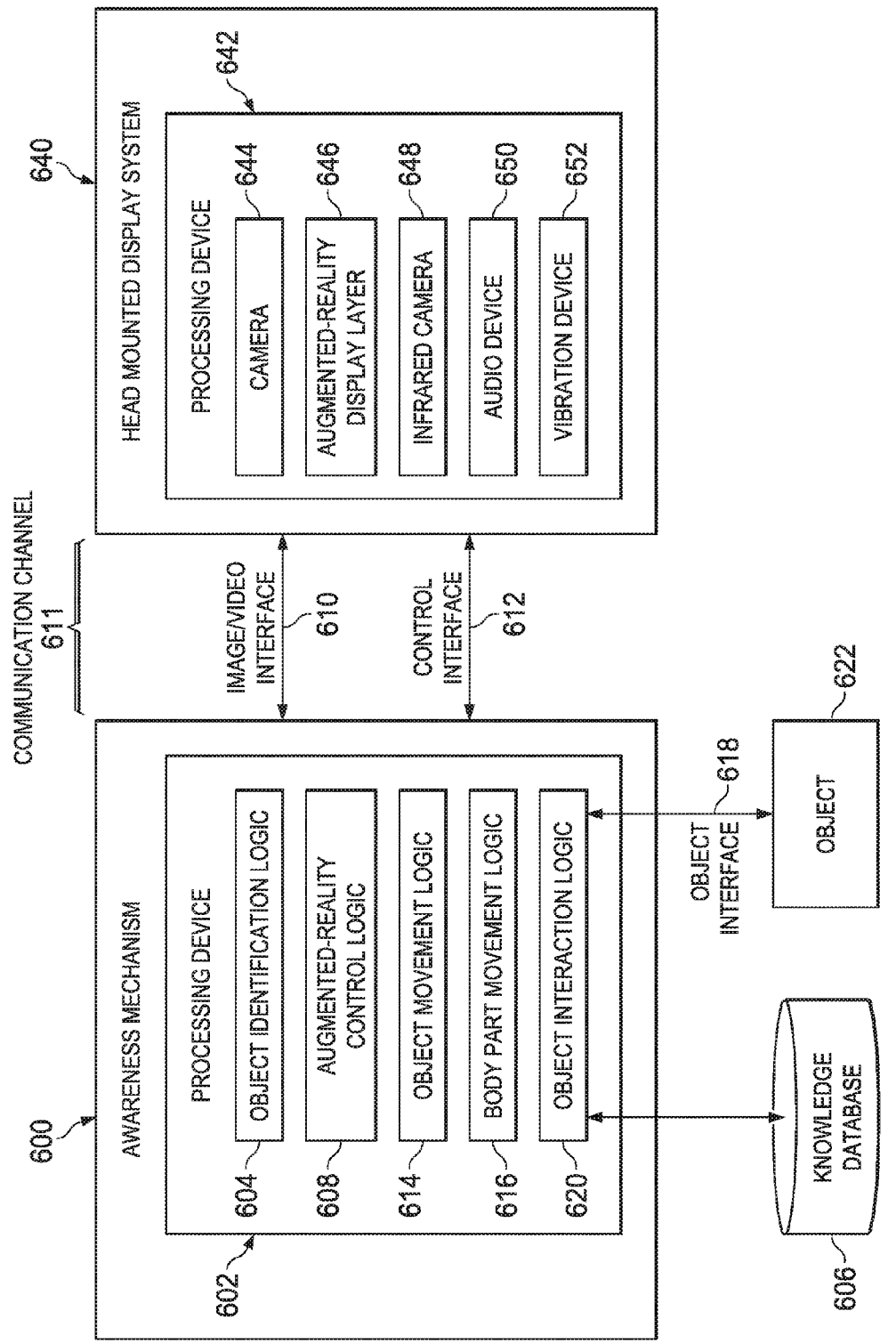
FIG. 6 depicts a block diagram of an electronic device with an augmented-reality (AR) control for interacting with a HMD system with an AR display mechanism in accordance with an illustrative embodiment.

FIG. 6 depicts a block diagram of an electronic device with an augmented-reality (AR) control for interacting with a HMD system with an AR display mechanism in accordance with an illustrative embodiment. In the illustrative embodiment, awareness mechanism 600 is an electronic device such as a tablet device, cellular telephones, PDAs, portable media players, netbooks, laptops, desktop, server, or the like. Awareness mechanism 600 and HMD system 640 both comprise a processing device, processing device 602 and processing device 642. Processing device 602 and processing device 642 may each be a processor, a microprocessor, a microcontroller, a special-purpose processor, a digital signal processor ("DSP"), an application specific integrated circuit ("ASIC"), a field programmable gate array ("FPGA"), or the like. In one embodiment, processing device 602 and processing device 642 execute one or more of the operations described herein, such as the indicating danger areas associated with objects to a user through HMD system 640 as described hereafter. Although illustrated as being executed by the processing device 602 and processing device 642, the various logic and mechanisms described hereafter may be implemented as processing logic comprising hardware (circuitry, dedicated logic, etc.), software (such as is run on a general-purpose computing system or a dedicated machine), firmware (embedded software), or any combination thereof.

As a user activates HMD system 640, HMD system 640 connects to awareness mechanism 600 via communication channel 611, which may be a wired communication channel as is illustrated in FIG. 3, or a wireless communication channels as is illustrated in FIG. 4. Utilizing a peripheral device, such as camera 644 within HMD system 640, one or more images or a live stream of video of a particular object that is being used by the user wearing HMD system 640 is transmitted via image/video interface 610 of communication channel 611 to awareness mechanism 600. Object identification logic 604 utilizes the received one or more images and/or video to identify the particular object in the image from knowledge database 606, which is a database of information regarding objects. Knowledge database 606 also includes other information of each object such as machine specifications, behaviors, danger areas, social feedback regarding interactions with the particular object, or the like.

Once object identification logic 604 identifies the particular object that is being utilized, object identification logic 604 identifies areas associated with the particular object that should be identified as dangerous as well as any warnings that should be translated to the user regarding the use of the particular object. Once identified, object identification logic 604 transfers the warning/danger information to AR control logic 608. Using the warning/danger information, AR control logic 608 generates an overlay for each warning and danger area that coincides with the images and/or video that is being sent from HMD system 640. AR control logic 608 sends these overlays to AR display layer 646 in HMD system 640 via control interface 612 so that the overlays are displayed via the AR display area 646 in conjunction with the object that is being seen by the user of HMD system 640. The overlays may be slightly larger (i.e., a few centimeters, inches, or the like) than the actual warning/danger areas to account for the user's head movement and the delay of transmitting the one or more images and/or video to awareness mechanism 600 and the processing by object identification logic 604 and AR control logic 608.

AR control logic 608 in conjunction with AR display layer 646 may display warning areas in one color, such as light yellow, while displaying danger areas in another color, such as light red. Further, danger areas may have different levels. For example, with a table saw, the blade area is considered a danger area. However, if the blade guard is installed the danger area may be considered a lower area of danger than when the blade guard has been removed, which would be considered a higher area of danger. Therefore, AR control logic 608 in conjunction with AR display layer 646 may display a lower area of danger in a light red while displaying a higher area of danger in a medium to dark red.

In another embodiment, in addition to recognizing and identifying the warning/danger areas associated with an identified object, HMD system 640 also identifies the movement of the identified object and any warning and/or danger areas that may be caused by the movement of the object. That is, awareness mechanism 600 also comprises object movement logic 614 that, based on one or more images and/or video from camera 644, identifies a non-turning blade on a table saw in one time period, then object movement logic 614 may instruct AR control logic 608 in conjunction with AR display layer 646 to display only a warning for the area around the blade. However, if in another time period, based on one or more images and/or video from camera 644 object movement logic 614 identifies a turning blade on a table saw, then object movement logic 614 may instruct AR control logic 608 in conjunction with AR display layer 646 to display only danger areas around the blade.

While the above illustration is with relation to apparent dangers, i.e. a blade of a table saw, others dangers may not be immediately apparent. These dangers may also be indicated by awareness mechanism 600. For example, while the blade of a table saw is immediately apparent, the heat of the motor of the table saw after a prolonged use of the table saw may cause burns to the user, if the user touches the motor. Other examples where dangers may exist that may not be immediately apparent are, for example, tools that spray noxious compounds on to a subject work item, chemicals in general, rebar that has recently been cut by a cutoff saw or acetylene torch, or the like.

In yet another embodiment, in addition to recognizing and identifying the warning/danger areas associated with an identified object, HMD system 640 also includes infrared camera 648 to identify and track movement of body parts of the user. Using infrared technology, infrared camera 648 captures one or more infrared images or a live stream of video of body part movement of the user wearing HMD system 640, which is transmitted via image/video interface 610 of communication channel 611 to awareness mechanism 600. Body part movement logic 616 within awareness mechanism 600 uses the one or more infrared images and/or video to identify when the user's body parts, i.e. hand, arm, foot, leg, or the like, enters the area being viewed through the lenses of HMD system 640. Based on the direction of body part movement, body part movement logic 616 software extrapolates the direction of the body part and accordingly will check if the extrapolated direction of the body part is crossing a warning or danger area identified by object identification logic 604 and/or object movement logic 614. If body part movement logic 616 determines that the movement of the identified body part of the user indicates that the body part(s) may touch the danger area, then body part movement logic 616 calculate a distance of the warning/danger area of the object with respect to the body part and determines a degree of warning that is to be issued to the user.

Once the degree of warning is determined, body part movement logic 616 instructs AR control logic 608 to issue the appropriate action, which may include a visual notification via AR display layer 646, an audio notification via audio device 650 within HMD system 640, a vibration notification via vibration device 652 within HMD system 640, or a combination of these via control interface 612. For example, if the user is using a table saw and a recognition is made of the user's hand being on the edge of the table heading towards the blade while pushing some wood stock through the blade, then body part movement logic 616 may instruct AR control logic 608 to display a warning area around the user's hand. As a further example, if the user is using a table saw and a recognition is made of the user's hand being within a foot of the blade while pushing some wood stock through the blade, then body part movement logic 616 may instruct AR control logic 608 to display a danger area around the user's hand and issue an audio warning. As still a further example, if the user is using a table saw and a recognition is made of the user's hand being within inches of the blade while pushing some wood stock through the blade, then body part movement logic 616 may instruct AR control logic 608 to display the danger area around the user's hand, issue a louder audio warning, and vibrate the HMD system.

In still another embodiment, as more objects have sensors and communication devices that communicate status information, such as blade spinning, auto lock disengaged, safety panel open, or the like, object interaction logic 620 in awareness mechanism 600 may be in communication with such objects 622 via object interface 618. If information is received from the particular object that the user of HMD system 640 is using that indicates a need for a warning or danger notification, then object interaction logic 620 may use the information from the particular object to instruct AR control logic 608 in conjunction with AR display layer 646 to display only a warning for the area identified by the object. Still further, if body part movement logic 616 identifies a situation where injury to the user is imminent, then body part movement logic 616 may send a notification to object interaction logic 620 so that object interaction logic 620 may communicate with the particular object to cause one or more of stopping movement of/to one or more parts of the object, reversing movement of/to one or more parts of the object if the reversal will not cause any harm to the user, shutting down the object altogether, or the like.

Figure 7:
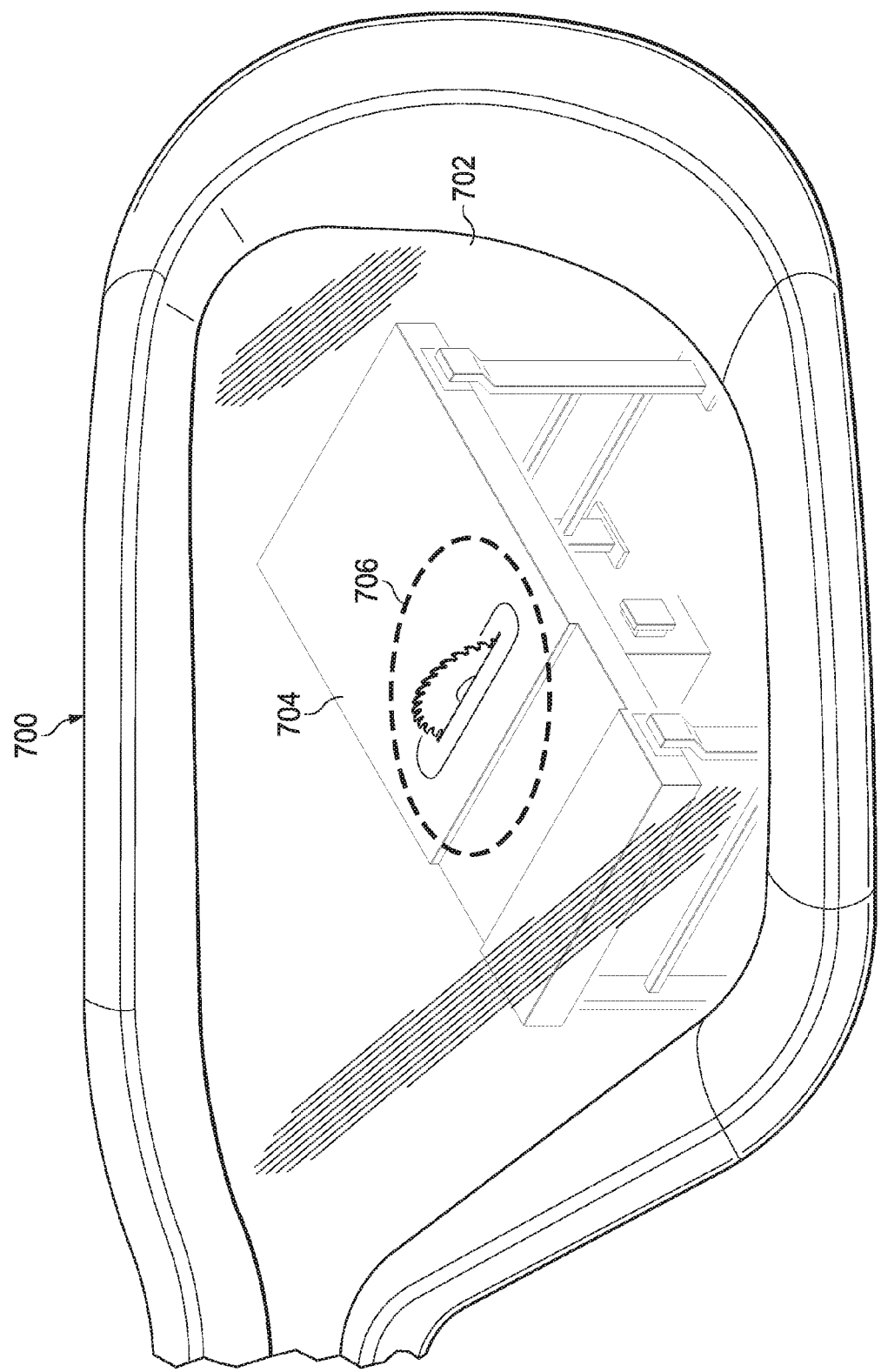
FIG. 7 illustrates a lens of a HMD system with the danger area overlay associated with an object in accordance with an illustrative embodiment.

In order to illustrate one embodiment of the above described invention, FIG. 7 illustrates a lens of a HMD system with the danger area overlay associated with an object in accordance with an illustrative embodiment. As is illustrated, through lens 702 of HMD system 700, the user sees table saw 704 that the user is using as well as danger area 706 that has been overlaid by AR control logic in conjunction with AR display layer of the HMD system 700.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the users computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart, or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart, illustration, can be implemented by special purpose hardware-based systems that perform the specified functions or acts or carry out combinations of special purpose hardware and computer instructions.

Figure 8:
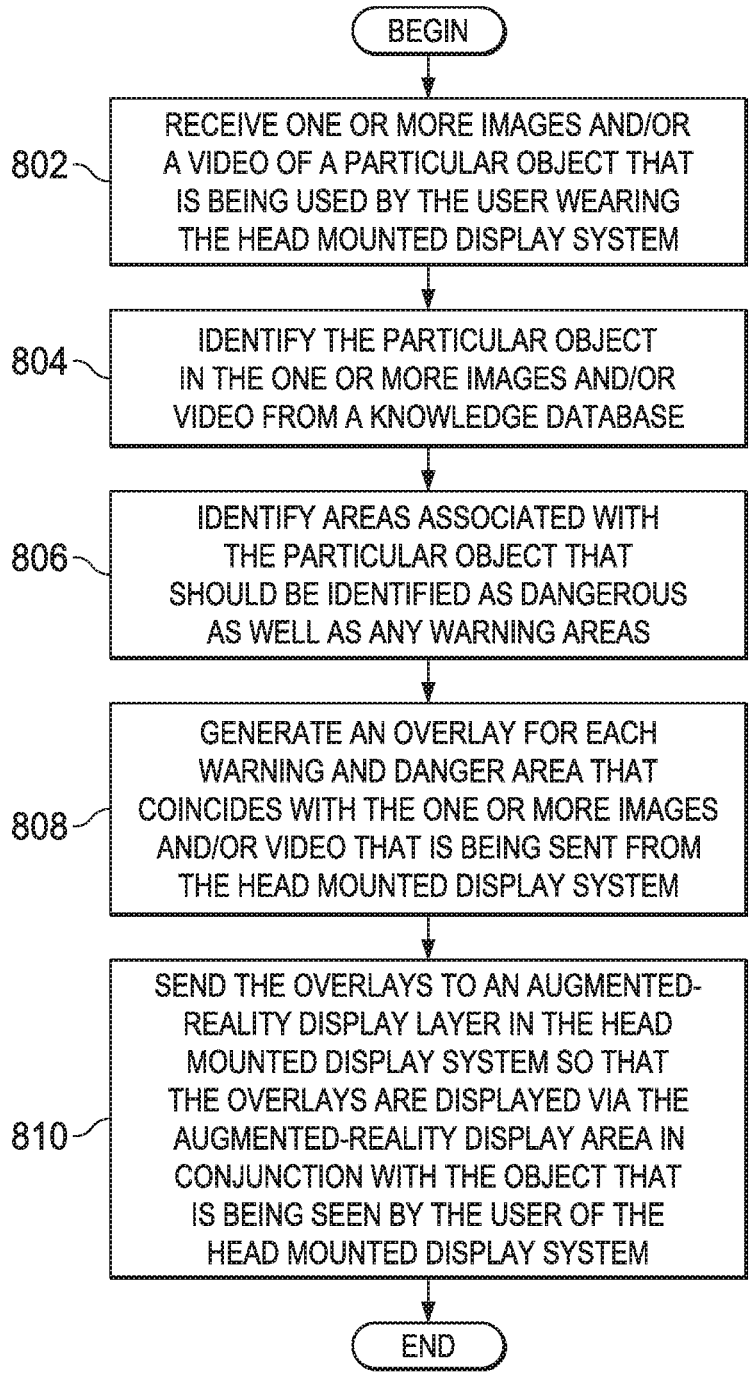
FIG. 8 depicts a flowchart of an operation performed in showing danger areas near objects to a user in accordance with an illustrative embodiment.

FIG. 8 depicts a flowchart of an operation performed in showing danger areas near objects to a user in accordance with an illustrative embodiment. As the operation begins, an awareness mechanism receives one or more images and/or a video of a particular object that is being used by the user wearing the HMD system captured via a camera within a HMD system (step 802). The awareness mechanism utilizes the received one or more images and/or video to identify the particular object in the one or more images and/or video from a knowledge database (step 804). The knowledges database is a database of information regarding objects that includes information of each object such as machine specifications, behaviors, danger areas, social feedback regarding interactions with the particular object, or the like.

Once the particular object is identified, the awareness mechanism identifies areas associated with the particular object that should be identified as dangerous as well as any warnings that should be translated to the user regarding the use of the particular object (step 806). Once identified, the awareness mechanism utilizes the identified warning/danger information to generate an overlay for each warning and danger area that coincides with the one or more images and/or video that is being sent from the HMD system (step 808). The awareness mechanism sends these overlays to an AR display layer in the HMD system (step 810) so that the overlays are displayed via the AR display area in conjunction with the object that is being seen by the user of the HMD system, with the operation ending thereafter. The overlays may be slightly larger (i.e., a few centimeters, inches, or the like) than the actual warning/danger areas to account for the user's head movement and the delay of transmitting the one or more images and/or video to the awareness mechanism and the processing of the overlays by the awareness mechanism. Additionally, the warning areas may be displayed in one color, such as light yellow, while the danger areas may be displayed in another color, such as light red. Further, the danger areas may have different levels such that a lower area of danger may be displayed in a lighter version of a color and a higher area of danger may displayed in a darker version of the same color.

Figure 9:
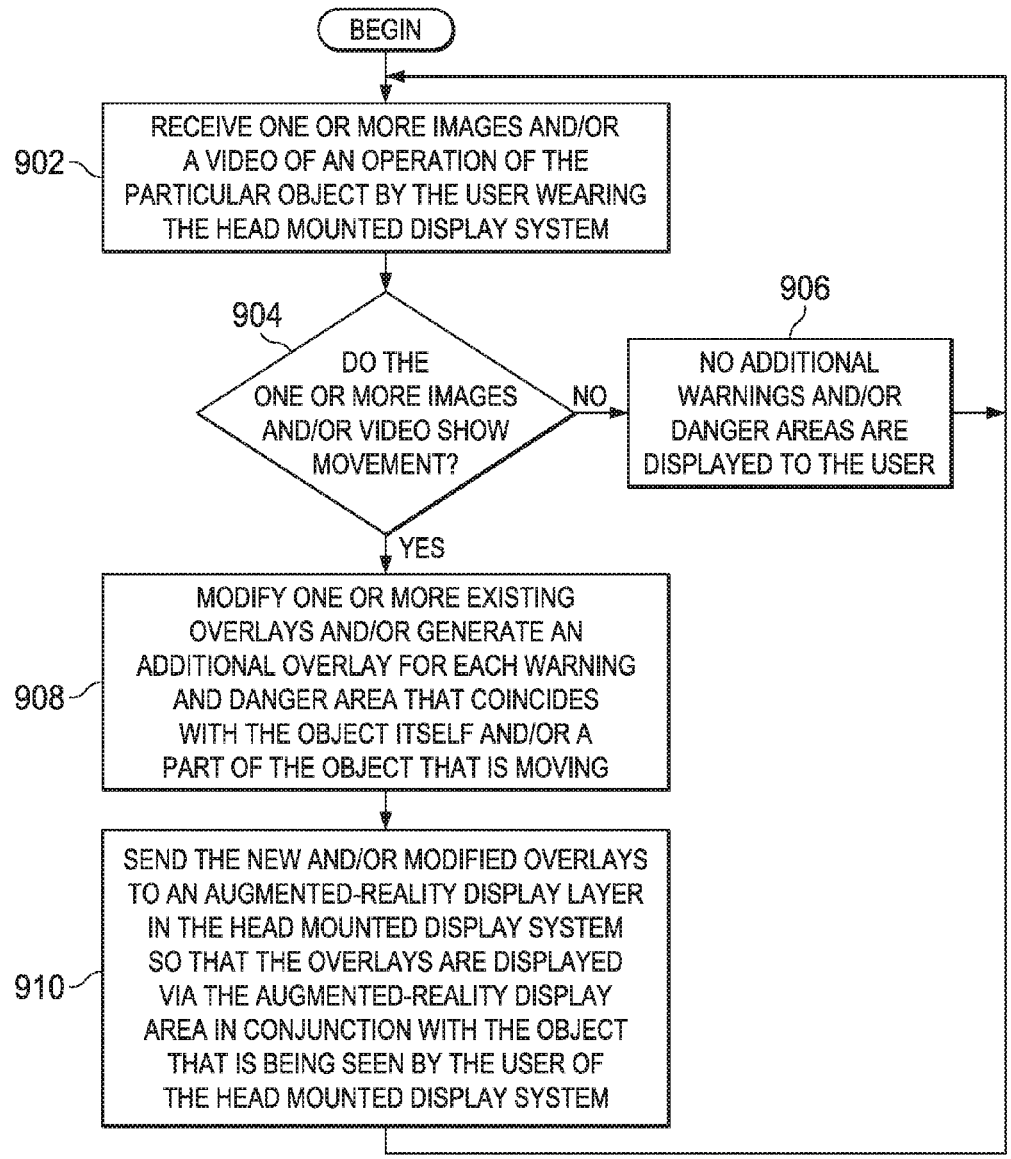
FIG. 9 depicts a flowchart of another operation performed in showing danger areas near objects to a user in accordance with an illustrative embodiment.

FIG. 9 depicts a flowchart of another operation performed in showing danger areas near objects to a user in accordance with an illustrative embodiment. As the operation begins, the awareness mechanism receives one or more images and/or a video showing the operation of the particular object (step 902). The awareness mechanism determines whether the one or more images and/or video shows a movement of the object and/or one or more parts of the object (step 904). If at step 904 the awareness mechanism determines that the object itself and/or a part of the object is not moving, then no additional warnings and or danger areas are displayed to the user (step 906), with the operation returning to step 902. If at step 904 the awareness mechanism determines that the object itself and/or a part of the object is moving, then the awareness mechanism may modify one or more existing overlays and/or generate an additional overlay for each warning and danger area that coincides with the object itself and/or a part of the object that is moving (step 908). The awareness mechanism sends these new and/or modified overlays to an AR display layer in the HMD system (step 910) so that the new and/or modified overlays are displayed via the AR display area in conjunction with the object that is being seen by the user of the HMD system, with the operation returning to step 902 thereafter.

Figure 10:
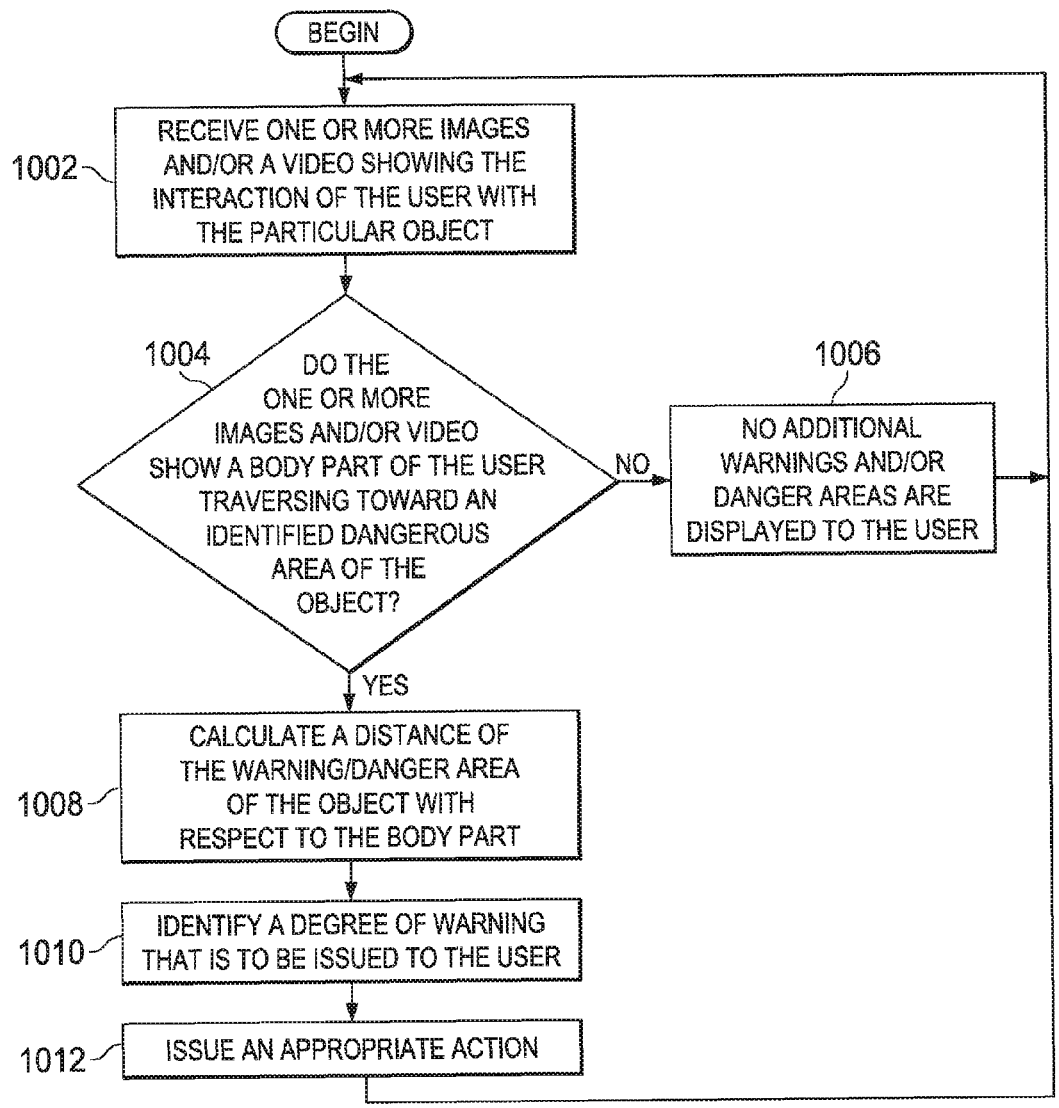
FIG. 10 depicts a flowchart of another operation performed in showing danger areas near objects to a user in accordance with an illustrative embodiment.

FIG. 10 depicts a flowchart of another operation performed in showing danger areas near objects to a user in accordance with an illustrative embodiment. As the operation begins, the awareness mechanism receives one or more images and/or a video showing the interaction of the user with the particular object (step 1002). The awareness mechanism determines whether the one or more images and/or video shows a body part of the user traversing toward an identified dangerous area of the object (step 1004). If at step 1004 the awareness mechanism determines that the movement of the body part is not toward an identified dangerous area of the object, then no additional warnings and or danger areas are displayed to the user (step 1006), with the operation returning to step 1002. If at step 1004 the awareness mechanism determines that the movement of the body part is toward an identified dangerous area of the object, then the awareness mechanism calculates a distance of the warning/danger area of the object with respect, to the body part (step 1008). Based on the calculated distance, the awareness mechanism identifies a degree of warning that is to be issued to the user (step 1010). Once the degree of warning is identified, the awareness mechanism issues an appropriate action (step 1012), which may include a visual notification, an audio notification, a vibration notification via, or any combination thereof. The operation returns to step 1002 thereafter.

Figure 11:
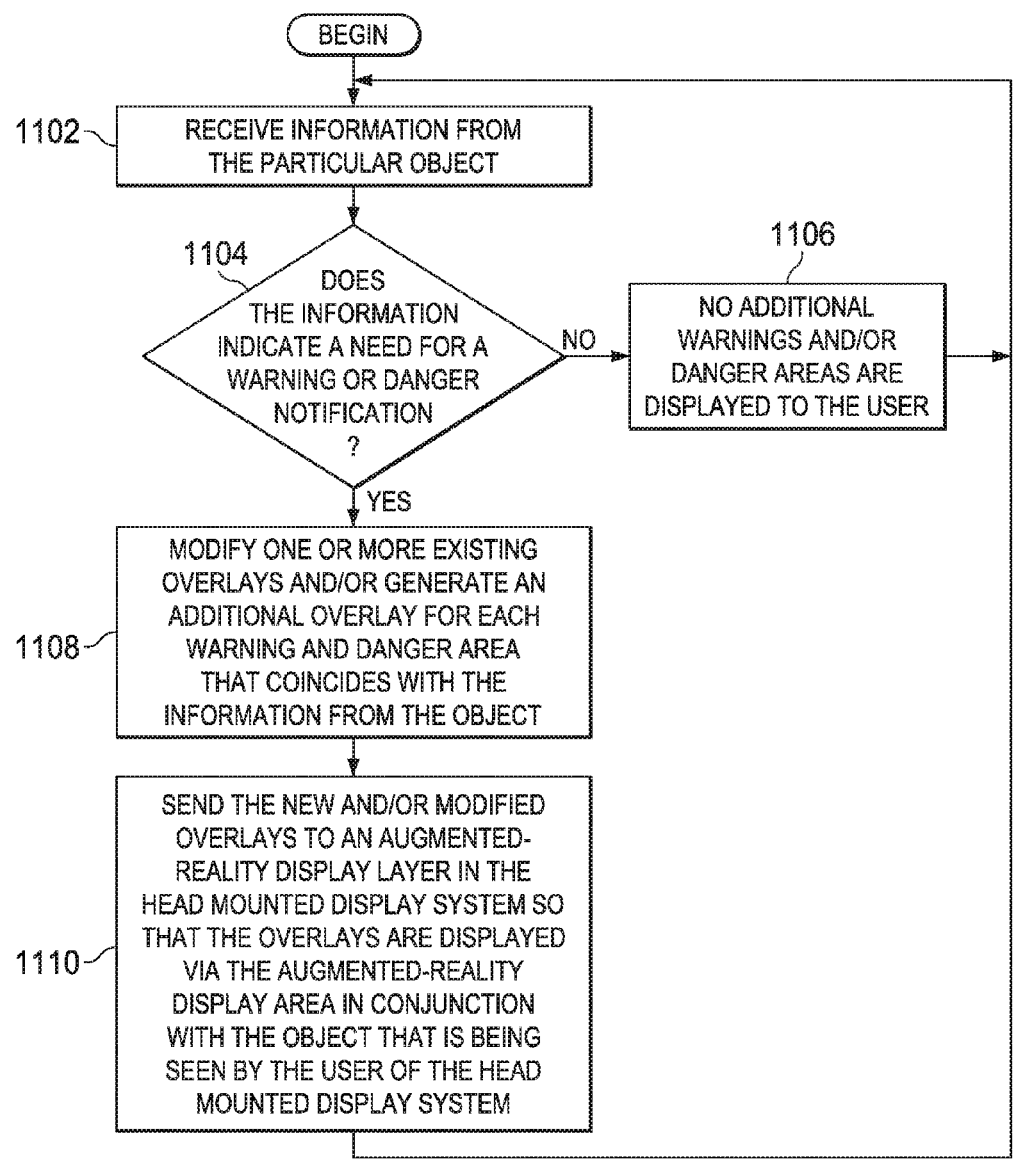
FIG. 11 depicts a flowchart of another operation performed in showing danger areas near objects to a user in accordance with an illustrative embodiment.

FIG. 11 depicts a flowchart of another operation performed in showing danger areas near objects to a user in accordance with an illustrative embodiment. As the operation begins, the awareness mechanism receives information from the particular object (step 1102). The awareness mechanism determines whether the information that is received from the particular object that the user of HMD system is using indicates a need for a warning or danger notification (step 1104). If at step 1104 the awareness mechanism determines that the information that is received from the particular object that the user of HMD system is using fails to indicate a need for a warning or danger notification, then no additional warnings and or danger areas are displayed to the user (step 1106), with the operation returning to step 1102. If at step 1104 the awareness mechanism determines that the information that is received from the particular object that the user of HMD system is using indicates a need for a warning or danger notification, then the awareness mechanism may modify one or more existing overlays and/or generate an additional overlay for each warning and danger area that coincides with the information that is received from the particular object (step 1108). The awareness mechanism sends these new and/or modified overlays to an AR display layer in the HMD system (step 1110) so that the new and/or modified overlays are displayed via the AR display area in conjunction with the object that is being seen by the user of the HMD system, with the operation returning to step 1102 thereafter.

Thus, the illustrative embodiments provide mechanisms for an augmented-reality (AR) control mechanism for showing danger areas near objects to a user. Utilizing head mounted display (HMD) mechanisms, such as glasses, goggles, face shield, or the like, the illustrative embodiments utilize object recognition to detect the object being utilized by the user. Once the object is identified, the HMD mechanism references a catalog of danger areas associated with objects to identify danger areas associated with the detected object. Then utilizing an augmented reality (AR) control mechanism, the HMD mechanism in conjunction with the AR control mechanism overlays the danger areas associated with the detected object. Thus, the user of the HMD system not only sees the object that is being used, but also visualizes the danger areas associated with the object as is presented by the AR control mechanism. In addition, if the HMD mechanism detects an event such as the user's hand getting too close to the blade of a table saw, then the HMD mechanism in conjunction with the AR control mechanism may cause a flashing light to be displayed to the user, the HMD mechanism to vibrate, or some other notification through the HMD mechanism. Further, based on the identified danger areas associated with the object, the HMD mechanism in conjunction with the AR control mechanism may distinguish different danger zones with varying degrees of danger utilizing different colors or shades of color.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times, code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for indicating an area of an object that is considered dangerous to a user via a head mounted display (HMD) system, the method comprising:
    receiving, by the data processing system, one or more images or video captured from a camera mounted to the HMD system that is separate from the data processing system;
    identifying, by the data processing system, the object being used by the user from the one or more images or video;
    identifying, by the data processing system, one or more areas of the object that are considered dangerous;
    responsive to identifying one or more areas of the object that are considered dangerous, thereby forming a set of dangerous areas, generating, by the data processing system, an overlay for each dangerous area of the set of dangerous areas;
    displaying, by the data processing system, the overlay for each dangerous area of the set of dangerous areas that is visible to the user from the HMD system via a display layer of the HMD system so that each dangerous area of the set of dangerous areas that is visible to the user from the HMD system is identified as an overlay to the object that is visible by the user through the HMD system;
    identifying, by the data processing system, a body part of the user traversing toward an identified dangerous area of the object;
    calculating, by the data processing system, a distance of the identified danger area of the object with respect to the body part of the user;
    based on the calculated distance, identifying, by the data processing system, a degree of warning that is to be issued to the user; and
    issuing, by the data processing system, one or more appropriate actions that coincide with the degree of warning, wherein the one or more appropriate actions include at least one of a visual notification, an audio notification, or a vibration notification to the user, and wherein the one or more appropriate actions further includes an action communicated to the object that causes the object to either reverse movement of one or more parts of the object if the reversal will not cause any harm to the user or reverse movement to one or more parts of the object if the reversal will not cause any harm to the user.

2. The method of claim 1, wherein the object that is being used by the user is identified via one or more images or video that is captured from a camera that is mounted to the HMD system, wherein the camera captures the one or more images or the video that correlates to the view of the user of the HMD system.

3. The method of claim 1, wherein the one or more areas of the object that are considered dangerous are identified from a knowledge database that coincides with an identification of the object via one or more images or video and wherein the knowledges database is a database of information regarding objects that includes information of objects including one or more of object specifications, object behaviors, danger areas associated with objects, or social feedback regarding interactions with objects.

4. The method of claim 1, wherein an overlay for each one or more areas of the object that are considered dangerous are larger than the actual area of the object that is considered dangerous to account for the movement of the user's head and a delay in processing one or more images or video by the data processing system.

5. The method of claim 1, further comprising:
    identifying, by the data processing system, one or more areas of the object that are considered to be warning areas;
    responsive to identifying one or more areas of the object that are considered to be warning areas, generating, by the data processing system, an overlay for each of the one or more areas of the object that are considered to be warning areas; and
    displaying, by the data processing system, the overlay for each one or more areas of the object that are considered to be warning areas via the display layer of the HMD system so that the one or more areas of the object that are considered to be warning areas are identified as an overlay to the object that is being seen by the user through the HMD system.

6. The method of claim 5, wherein the overlay for each one or more areas of the object that are considered to be warning areas are displayed in a first color while the overlay for each one or more areas of the object that are considered dangerous are displayed in a second color that is different from the first color.

7. The method of claim 5, further comprising:
    identifying, by the data processing system, at least one of a movement of the object or a movement of one or more parts of the object;
    either modifying, by the data processing system, one or more existing overlays or generating, by the data processing system, an additional overlay for each warning area or danger area that coincides with the movement of the object or the movement of the one or more parts of the object; and
    displaying, by the data processing system, the modified or new overlay for each of the warning areas or danger areas that coincides with the movement of the object or the movement of the one or more parts of the object via the display layer of the HMD system so that each of the warning areas or danger areas that coincides with the movement of the object or the movement of the one or more parts of the object are identified as an overlay to the object that is being seen by the user through the HMD system.

8. The method of claim 1, wherein the one or more areas of the object that are considered dangerous comprise areas that are identified as being a different level of danger and wherein the overlay for each one or more areas of the object that are considered to be a low level of danger are displayed in a first color while the overlay for each one or more areas of the object that are considered to be a high level of danger are displayed in a second color that is different from the first color.

9. The method of claim 1, further comprising:
receiving, by the data processing system, information from the object;
determining, by the data processing system, whether the information indicates a need for a warning or danger notification;
responsive to the information indicating the need for the warning or danger notification, either modifying, by the data processing system, one or more existing overlays or generating, by the data processing system, an additional overlay for each warning or danger indicated by the information from the object; and
displaying, by the data processing system, the modified or new overlay for each warning or danger indicated by the information from the object via the display layer of the HMD system so that each of the warning or danger indicated by the information from the object are identified as an overlay to the object that is being seen by the user through the HMD system.

10. A computer program product comprising a computer readable storage medium having a computer readable program stored therein, wherein the computer readable program, when executed on a computing device, causes the computing device to:
receiving one or more images or video captured from a camera mounted to a head mounted display (HMD) system that is separate from the computing device;
identify an object being used by the user from the one or more images or video;
identify one or more areas of the object that are considered dangerous;
responsive to identifying one or more areas of the object that are considered dangerous, thereby forming a set of dangerous areas, generate an overlay for each dangerous area of the set of dangerous areas;
display the overlay for each dangerous area of the set of dangerous areas that is visible to the user from the HMD system via a display layer of the HMD system so that each dangerous area of the set of dangerous areas that is visible to the user from the HMD system is identified as an overlay to the object that is visible by the user through the HMD system;
identify a body part of the user traversing toward an identified dangerous area of the object;
calculate a distance of the identified danger area of the object with respect to the body part of the user;
based on the calculated distance, identify a degree of warning that is to be issued to the user; and
issue one or more appropriate actions that coincide with the degree of warning, wherein the one or more appropriate actions include at least one of a visual notification, an audio notification, or a vibration notification to the user, and wherein the one or more appropriate actions further includes an action communicated to the object that causes the object to either reverse movement of one or more parts of the object if the reversal will not cause any harm to the user or reverse movement to one or more parts of the object if the reversal will not cause any harm to the user.

11. The computer program product of claim 10, wherein the one or more areas of the object that are considered dangerous are identified from a knowledge database that coincides with an identification of the object via one or more images or video and wherein the knowledges database is a database of information regarding objects that includes information of objects including one or more of object specifications, object behaviors, danger areas associated with objects, or social feedback regarding interactions with objects.

12. The computer program product of claim 10, wherein an overlay for each one or more areas of the object that are considered dangerous are larger than the actual area of the object that is considered dangerous to account for the movement of the user's head and a delay in processing one or more images or video by the data processing system.

13. The computer program product of claim 10, wherein the computer readable program further causes the computing device to:
identify one or more areas of the object that are considered to be warning areas;
responsive to identifying one or more areas of the object that are considered to be warning areas, generate an overlay for each of the one or more areas of the object that are considered to be warning areas; and
display the overlay for each one or more areas of the object that are considered to be warning areas via the display layer of the HMD system so that the one or more areas of the object that are considered to be warning areas are identified as an overlay to the object that is being seen by the user through the HMD system.

14. The computer program product of claim 13, wherein the computer readable program further causes the computing device to:
identify at least one of a movement of the object or a movement of one or more parts of the object;
either modify one or more existing overlays or generate an additional overlay for each warning area or danger area that coincides with the movement of the object or the movement of the one or more parts of the object; and
display the modified or new overlay for each of the warning areas or danger areas that coincides with the movement of the object or the movement of the one or more parts of the object via the display layer of the HMD system so that each of the warning areas or danger areas that coincides with the movement of the object or the movement of the one or more parts of the object are identified as an overlay to the object that is being seen by the user through the HMD system.

15. The computer program product of claim 10, wherein the one or more areas of the object that are considered dangerous comprise areas that are identified as being a different level of danger and wherein the overlay for each one or more areas of the object that are considered to be a low level of danger are displayed in a first color while the overlay for each one or more areas of the object that are considered to be a high level of danger are displayed in a second color that is different from the first color.

16. The computer program product of claim 10, wherein the computer readable program further causes the computing device to:
receive information from the object;
determine whether the information indicates a need for a warning or danger notification;
responsive to the information indicating the need for the warning or danger notification, either modify one or more existing overlays or generate an additional overlay for each warning or danger indicated by the information from the object; and
display the modified or new overlay for each warning or danger indicated by the information from the object via the display layer of the HMD system so that each of the warning or danger indicated by the information from the object are identified as an overlay to the object that is being seen by the user through the HMD system.

17. An apparatus comprising:
a processor; and
a memory coupled to the processor, wherein the memory comprises instructions which, when executed by the processor, cause the processor to:
identify an object being used by the user;
receiving one or more images or video captured from a camera mounted to a head mounted display (HMD) system that is separate from the apparatus;
identify an object being used by the user from the one or more images or video;
identify one or more areas of the object that are considered dangerous;
responsive to identifying one or more areas of the object that are considered dangerous, thereby forming a set of dangerous areas, generate an overlay for each dangerous area of the set of dangerous areas;
display the overlay for each dangerous area of the set of dangerous areas that is visible to the user from the HMD system via a display layer of the HMD system so that each dangerous area of the set of dangerous areas that is visible to the user from the HMD system is identified as an overlay to the object that is visible by the user through the HMD system;
identify a body part of the user traversing toward an identified dangerous area of the object;
calculate a distance of the identified danger area of the object with resect to the body part of the user;
based on the calculated distance, identify a degree of warning that is to be issued to the user; and
issue one or more appropriate actions that coincide with the degree of warning, wherein the one or more appropriate actions include at least one of a visual notification, an audio notification, or a vibration notification to the user, and wherein the one or more appropriate actions further includes an action communicated to the object that causes the object to either reverse movement of one or more parts of the object if the reversal will not cause any harm to the user or reverse movement to one or more parts of the object if the reversal will not cause any harm to the user.

* * * * *